United States Patent [19]
Pennington

[11] 3,876,486
[45] Apr. 8, 1975

[54] HEAT SEALING OF PLASTIC SHEETS
[76] Inventor: William Pennington, 30200 Oceanaire Dr., Palos Verdes Peninsula, Calif. 90274
[22] Filed: Dec. 6, 1973
[21] Appl. No.: 422,574

[52] U.S. Cl. .......... 156/380; 5/348 WB; 93/DIG. 1; 156/581; 219/10.41; 219/10.53
[51] Int. Cl. ............................................. B29c 27/04
[58] Field of Search .......... 156/272, 300, 273, 380, 156/275, 381, 290, 583, 581; 5/348 WB; 219/10.81, 10.71, 10.53, 10.41, 10.57; 425/174.6, 174.8; 264/25, DIG. 46, 26; 117/93.1 H; 161/147, 149; 93/DIG. 1

[56] References Cited
UNITED STATES PATENTS
| | | | |
|---|---|---|---|
| 2,526,697 | 10/1950 | Scott, Jr. | 219/10.53 |
| 2,603,741 | 7/1952 | Siefried et al. | 117/93.1 H |
| 2,991,216 | 7/1961 | Hsu et al. | 156/273 |
| 3,401,248 | 10/1968 | Kim | 219/10.53 |

FOREIGN PATENTS OR APPLICATIONS
669,318  4/1952  United Kingdom.............. 219/10.53

Primary Examiner—Douglas J. Drummond
Assistant Examiner—J. Gallagher
Attorney, Agent, or Firm—William W. Haefliger

[57] ABSTRACT

The heat bonding of plastic sheets includes the steps:

a. transmitting high frequency electrical energy in one direction through a first portion of said sheets of sufficient area as to preclude heat bonding of the sheets at said first portion thereof, and b. transmitting said energy back through a second portion of the sheets and of sufficiently reduced area as to effect heating bonding of the sheets at said second portion.

12 Claims, 6 Drawing Figures

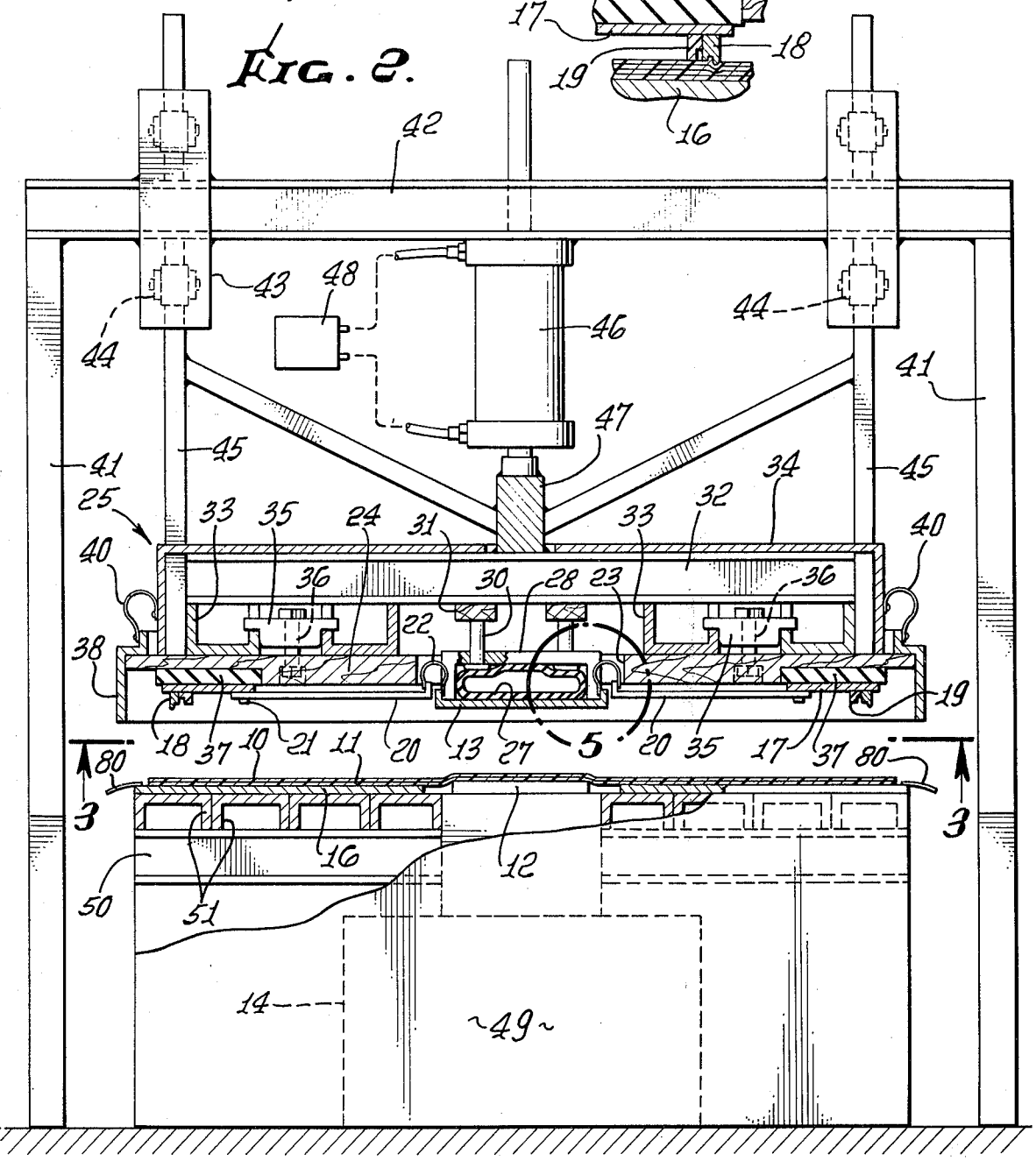

HEAT SEALING OF PLASTIC SHEETS

BACKGROUND OF THE INVENTION

This invention relates generally to heat sealing or bonding of plastic sheets; more particularly, it concerns the production of uniformly satisfactory, high frequency bonding of the sheets along seams of substantial length.

When multiple plastic sheets are heat bonded as by high frequency techniques, certain problems are encountered. For example, irregular bonding may occur due to improper energy distribution resulting from energy feed lines of unequal lengths. Unsatisfactory bonding may also result from unequal gaps across which the energy flows between metallic surfaces defining a zone receiving the plastic layers or sheets to be bonded. These problems are enhanced and made extremely difficult to overcome where the seams to be bonded are of relatively great lengths, and where a movable platen is employed to close against and retract from the plastic sheets, as is required for high production rates. So far as I am aware, there has been no solution to these problems which embodies the unusually advantageous method, features of construction, mode of operation and results as now are afforded by the present invention.

SUMMARY OF THE INVENTION

Basically, the method of the invention involves transmitting high frequency electrical energy in one direction through a first portion of multiple thermoplastic sheets of sufficient area as to preclude heat bonding of the sheets, and transmitting the energy, as from a movable platen, back through a second portion of the sheets of sufficiently reduced area as to secure the desired heat bonding, as along an elongated, narrow seam. As will appear, the energy is preferably distributed to the second portion of the sheets via multiple paths associated with the platen, and so that energy transmission via such paths is approximately equalized.

In its apparatus aspects, the invention includes feed through capacitor plates respectively located at opposite sides of a sheet receiving zone and of a size to pass the energy through the sheets without softening of the plastic layers; means to feed the energy to one of the plates for transmission to the other which may be carried by the movable platen; and means electrically connected to that other plate to receive energy therefrom for heat bonding the plastic layers. Such means may include die structure extending generally about the other feed through plate, and auxiliary capacitor plates at opposite sides of the work zone, one of such plates located at the same side of the zone as the one feed through capacitor plate, and the other auxiliary plate located at the opposite side of that zone and connected with the die structure and the other feed through capacitor plate.

Additional objects include the provision of flexible metallic straps connecting the other feed through capacitor plate and the other auxiliary plate, to equalize energy transmission, as will appear; floating support and cushioning of the other feed through capacitor plate on the platen; cushioning of the other auxiliary plate on the platen; and other simplifying structure details.

These and other objects and advantages of the invention, as well as the details of an illustrative embodiment, will be more fully understood from the following description and drawings, in which:

DRAWING DESCRIPTION

FIG. 1 is an electrical diagram;

FIG. 2 is a vertical elevation showing one preferred form of the invention;

FIG. 5 is an enlarged section on lines 5—5 of FIG. 2, and

FIG. 6 is an enlarged section on lines 6—6 of FIG. 4.

DETAILED DESCRIPTION

Figure 3:
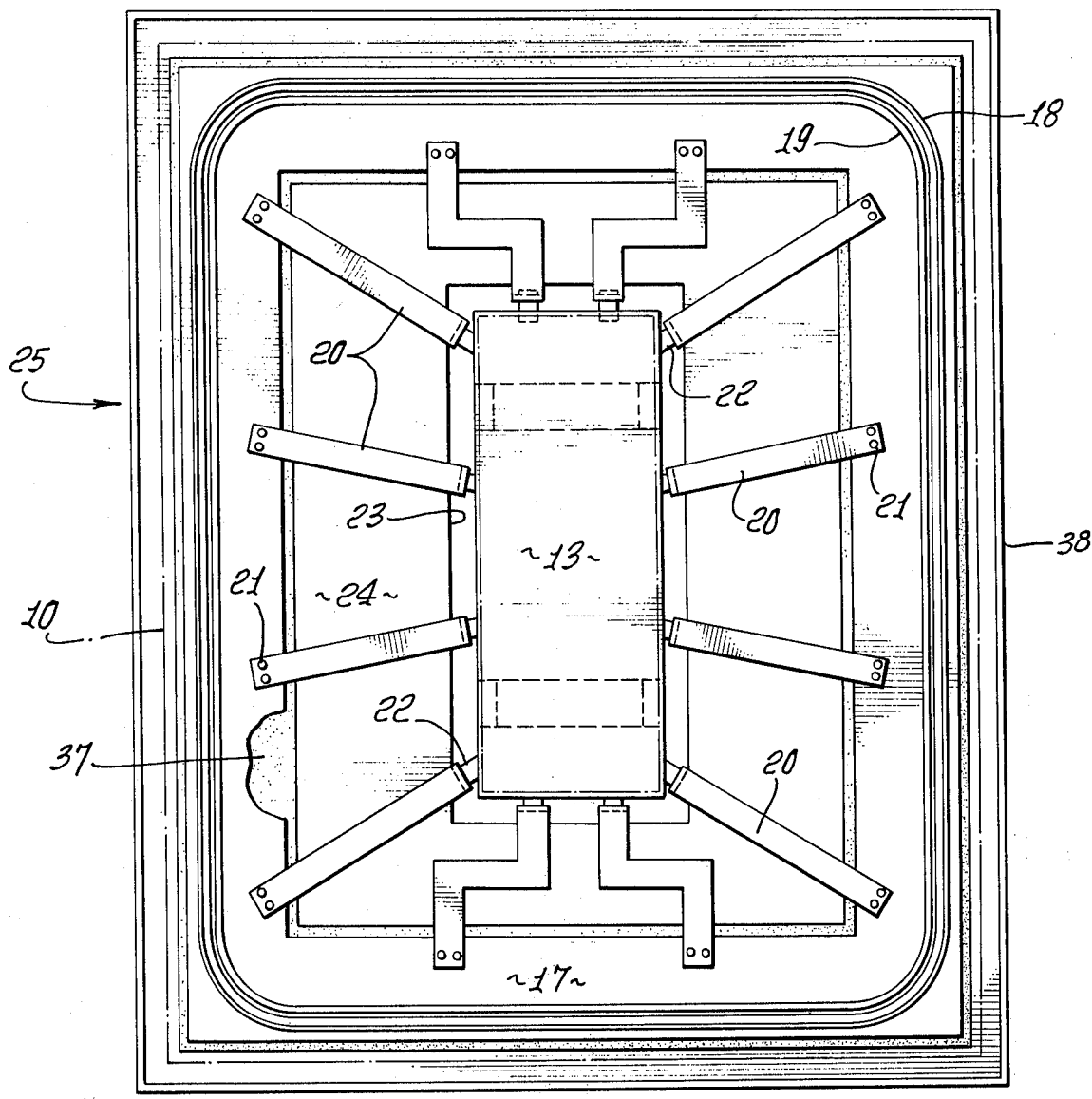
FIG. 3 is a view taken on lines 3—3 of FIG. 2.

In accordance with the invention, feed through capacitor plates are respectively located at opposite sides of a zone to receive plastic layers or sheets to be locally heat bonded. Examples of such layers are shown at 10 and 11, and may consist of vinyl sheets to be bonded together in a loop pattern, as described in my copending application, "Frameless Water Bed," Ser. No. 221,589, filed Jan. 28, 1972 now U.S. Pat. No. 3,787,907. Such capacitor plates are indicated at 12 and 13, and are of sufficient size (area) to pass high frequency electrical energy therebetween and through the layers without heat softening the latter at locations directly between the plates. Generator means is indicated at 14 directly below plate 12 to feed such energy to that plate, one typical frequency being 27.12 megacycles.

In accordance with one important aspect of the invention, means is electrically connected with the other of the plates 13 to receive electrical energy from the latter 12 for locally heat bonding the two layers 10 and 11. Such means for example includes die structure 17 extending generally about the other feed through plate 13, and auxiliary plates at opposite sides of the zone defined by sheets 10 and 11. For example, one of the auxiliary plates (designated at 16) extends in a loop at the same side of that zone as the r.f. generator 14, and the other of the auxiliary plates (designated at 17) extends in a loop at the opposite side of the zone is electrically connected with the die structure. The latter is represented at 18 and projects downwardly as a loop-shaped rib from supporting plate 17 to engage the upper sheet 10 in the manner designated in FIG. 4. A stop rib 19 projects adjacent rib 18 and limits its movement toward and in engagement with the upper sheet 10.

It will be noted that the electrical connection of the other auxiliary plate 17 with the floating feed-through plate 13 may, with unusual advantage, be defined by flexible metallic straps 20 which extend generally laterally outwardly from plate 13 toward loop shaped plate 17. Connections of the straps to such plates appear at 21 and 22, The latter comprising conductive metallic leaf springs located within a central opening 23 formed by support member 24 of platen 25, accomodating relative floating movement of plate 13 in a vertical direction. Such straps are of relatively short, equal lengths and width and thickness to feed electrical energy to all portions of the plate 17 and die structure 18, at approximately the same or equalized levels to assure uniform bonding of the sheets 10 and 11 along a uniform seam. This is of particular importance in the case where the sheets 10 and 11 are to be expanded by air pressure and water later inserted therebetween to form a water bed, so that seam leakage of air and water will be obviated.

Figure 4:
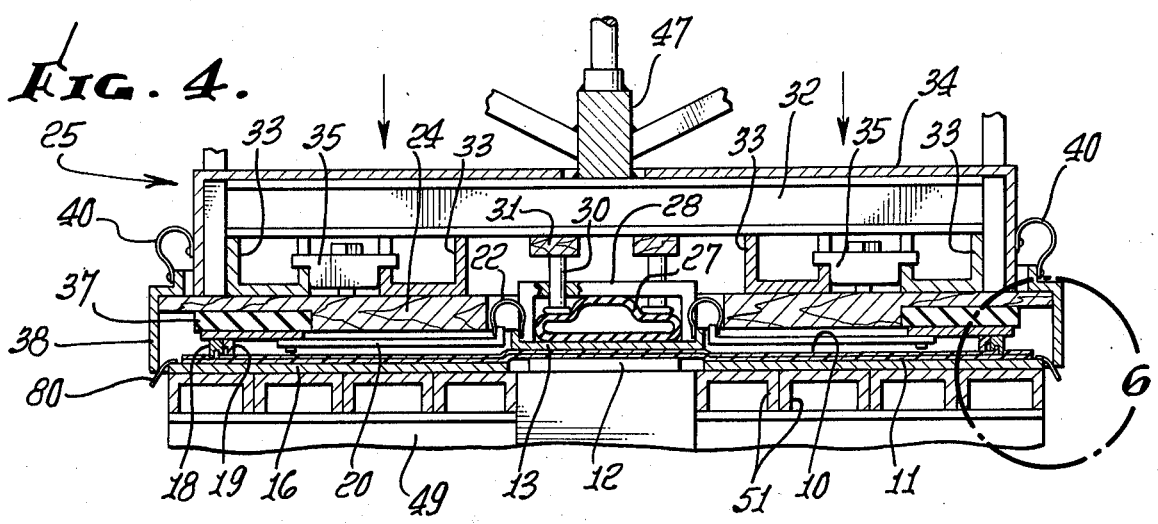
FIG. 4 is a fragmentary view of the heat sealing apparatus of FIG. 2, in closed position.

In addition plate 13 is supported by the platen 25 to float relative thereto, and in a vertical direction, to permit seating of plate 13 on the top plastic layer (as seen in FIG. 4), followed by limited bodily movement of the platen downwardly toward the plastic layers to bring the rib 18 into compressive relation with the plastic layers all around the loop, in order to assure development of a uniform bond. Accordingly, any small differences or variations in the gap dimension between the die rib 18 and the auxiliary plate 16, which supports the layers, are minimized and are not productive of non-uniform bonding at different location around the loop, and larger tolerances in such gap dimensions may be accommodated, to minimize cost of the equipment. In the example, such floating support is achieved by means of a resilient cushion in the form of a bladder 27 located between plate 13 and a bridge 28, and bonded to these elements. The bridge may be recessed at 29 to receive and confine the bladder, and slidably supported via vertical rods 30. The latter are supported by insulative pads 31 attached to the platen structure.

The platen 25 includes a cross-member 32 supporting elongated channel members 33, and covered by a housing 34. Members 33 support wooden blocks 35 from which connectors 36 extend downwardly and support member 24, as shown. A compressible rubber pad 37 is interposed between auxiliary capacitor plate 17 and member 26 to be compressed when die rib 18 engages the plastic sheet 10, as better seen in FIG. 6, for equalizing the pressure distribution. As there shown, multiple sheets, as for example four, may be heat-welded by use of the present apparatus. FIG. 2 shows a peripheral skirt 38 supported by the housing 34, as by means of flexible leaf springs 40.

A frame including members 41 and 42 supports guideways 43, including rollers 44, for vertical arms 45 that extend upwardly from the platen 25. An actuator 46 is carried by the frame and operatively connected to the platen via structure 47, to raise and lower the platen. Suitable fluid pressure control means for the actuator is indicated at 48. A base 49 supports the loop-shaped auxiliary plate 16, as via cross members 50 and 51. Note that plate 12 extends at a slightly higher elevation than plate 16, so that plate 13 will assuredly seat on the work proximate to plate 12 prior to completion of downward travel of the platen.

Through cycling use of the present apparatus, very high heat bonding production rates may be achieved, the bonds or seams being uniformly satisfactory. In this regard, electrical energy at high frequency is concentrated by the die rib 18 at the bond location, as such energy flows between plates 16 and 17, plate 16 being electrically grounded as is clear from FIG. 1.

FIGS. 2 and 4 also show the provision of flexible metal fingers 80 to contact skirt 38 when the top platen is lowered, to complete the grounding of the housing.

I claim:

1. In the process of heat bonding plastic layers, the combination comprising
   a. a zone to receive said layers,
   b. feed through capacitor plates respectively located at opposite sides of said zone and of a size to pass high frequency electrical energy therebetween and through said layers without significant softening of the layers,
   c. means to feed said energy to one of said plates, and
   d. means electrically connected to the other of said plates to receive electrical energy therefrom for heat bonding the plastic layers.

2. The combination of claim 1 including a platen supporting said other plate and relatively movable toward said zone to bring said feed through plates into proximity when said heat bonding is to be effected.

3. The combination of claim 2 wherein said means includes die structure which extends generally about said other feed through plate.

4. The combination of claim 3 wherein said mean includes auxiliary plates at opposite sides of said zone, one of said auxiliary plates at the same side of said zone as said one feed through capacitor plate, and the other of said auxiliary plates at the opposite side of said zone and electrically connected with said die structure.

5. The combination of claim 4 wherein the electrical connection of the other auxiliary plate with the other feed through plate is defined by flexible metallic straps extending generally laterally outwardly away from said other feed through plate.

6. The combination of claim 5 wherein said other feed through plate is supported by the platen to float relative thereto to permit seating of said other feed through plate on said plastic layers followed by limited bodily movement of the platen toward the plastic layers to bring the die structure into compressive relation with the plastic layers.

7. The combination of claim 6 including a frame, and an actuator carried by the frame and operatively connected with the plate to move the platen generally vertically.

8. The combination of claim 2 including said plastic layers of a size to form a waterbed when expanded by fluid and air inserted therebetween following said heat bonding.

9. The combination of claim 6 including a compressible cusion interposed between said other feed through plate and a platen support.

10. The combination of claim 4 wherein said die structure includes is carried by said other auxiliary plate to project therefrom toward said one auxiliary plate which is electrically grounded.

11. The combination of claim 10 including a resilient cushion interposed between said other auxiliary plate and said platen.

12. In combination,
   a. high frequency energy distribution plate means,
   b. auxiliary capacitor plates forming a plastic sheet receiving work zone therebetween,
   c. metallic straps interconnecting the distribution plate means and a first of said auxiliary plates, with said straps being of approximately equal length,
   d. a die rib between the auxiliary plates to concentrate electrical energy flowing therebetween at local portions of plastic sheet means to be heat bonded, and
   e. means to effect relative closing together of said auxiliary plates.

* * * * *